United States Patent
Wixom et al.

(10) Patent No.: US 7,282,301 B2
(45) Date of Patent: Oct. 16, 2007

(54) METHOD FOR MAKING A COMPOSITE ELECTRODE MATERIAL

(75) Inventors: Michael R. Wixom, Ann Arbor, MI (US); Chuanjing Xu, Ann Arbor, MI (US)

(73) Assignee: T/J Technologies, Inc., Ann Arbor, MI (US)

( * ) Notice: Subject to any disclaimer, the term of this patent is extended or adjusted under 35 U.S.C. 154(b) by 0 days.

(21) Appl. No.: 11/261,349

(22) Filed: Oct. 28, 2005

(65) Prior Publication Data

US 2006/0093919 A1 May 4, 2006

Related U.S. Application Data

(60) Provisional application No. 60/624,212, filed on Nov. 2, 2004.

(51) Int. Cl.
- *H01M 4/40* (2006.01)
- *H01M 4/58* (2006.01)
- *H01M 4/00* (2006.01)
- *C01B 25/30* (2006.01)
- *C01B 25/37* (2006.01)

(52) U.S. Cl. ............. 429/231.95; 429/221; 429/218.1; 252/182.1; 423/306

(58) Field of Classification Search ........... 429/231.95, 429/221; 252/182.1; 423/306
See application file for complete search history.

(56) References Cited

U.S. PATENT DOCUMENTS

| | | | | |
|---|---|---|---|---|
| 5,910,382 A | 6/1999 | Goodenough et al. | ... | 429/218.1 |
| 6,156,931 A | 12/2000 | Lewis | ........ | 564/123 |
| 6,391,493 B1 | 5/2002 | Goodenough et al. | ... | 429/218.1 |
| 6,514,640 B1 | 2/2003 | Armand et al. | ...... | 429/231.1 |
| 6,656,635 B2 * | 12/2003 | Okawa et al. | ...... | 429/221 |
| 6,730,281 B2 | 5/2004 | Barker et al. | ....... | 423/306 |
| 6,855,273 B2 | 2/2005 | Ravet et al. | ........ | 252/506 |
| 2004/0033360 A1 | 2/2004 | Armand et al. | ...... | 428/408 |
| 2004/0086445 A1 | 5/2004 | Armand et al. | ...... | 423/306 |
| 2004/0214084 A1 | 10/2004 | Barker et al. | ........ | 429/218.1 |

OTHER PUBLICATIONS

Delacourt et al., "The existence of a temperature-driven solid solution in LixFePO4 for 0</=x</=1," Nature Materials, Mar. 2005, vol. 4, pp. 254-260.*

Delacourt, C et al., The existence of a temperature-driven solid solution in LixFePO4 for 0</=x</=1, Mar. 2005, Nature Publishing Group, vol. 4, pp. 254-260.*

Delacourt et al., "The existence of a temperature-driven solid solution in LixFePO4 for $O \leqq x \leqq 1$", Nature materials, Mar. 2005, vol. 4, pp. 254-260.

Striebel et al., "Comparison of LiFePO4 from different sources", Manuscript submitted to Journal of the Electrochemical Society, Jun. 21, 2004, Revised Sep. 1, 2004, pp. 1-28.

* cited by examiner

*Primary Examiner*—Raymond Alejandro
*Assistant Examiner*—Angela J. Martin
(74) *Attorney, Agent, or Firm*—Gifford, Krass, Sprinkle, Anderson & Citkowski

(57) ABSTRACT

A composite material includes a first phase which comprises $Li_xM_y(PO_4)_z$ wherein M is at least one metal, y and z are independently 0, and x is less than or equal to 1. The material includes a second phase which has an electronic and/or lithium ion conductivity greater than that of the first phase. The material is prepared by heating a starting mixture which includes lithium, iron, a phosphate ion, and a catalyst in a reducing atmosphere. Also disclosed are electrodes which incorporate the material and batteries which utilize those electrodes as cathodes.

19 Claims, No Drawings

METHOD FOR MAKING A COMPOSITE ELECTRODE MATERIAL

RELATED APPLICATION

This application claims priority of U.S. Provisional Patent Application Ser. No. 60/624,212 filed Nov. 2, 2004, entitled "Method for Making a Composite Electrode Material."

FIELD OF THE INVENTION

This invention relates generally to methods for synthesizing materials. More specifically, the invention relates to methods for synthesizing composite materials which include a metal phosphate phase. Most specifically, the invention relates to a method for synthesizing a composite material which includes a lithiated metal phosphate phase together with a second conductivity-enhancing phase, as well as to electrodes made from such materials.

BACKGROUND OF THE INVENTION

Lithiated transition metal phosphates such as $LiFePO_4$, including various doped and modified versions thereof, are finding growing utility as cathode materials for lithium batteries. Such materials are disclosed in U.S. Pat. Nos. 6,730,281; 6,855,273; and 6,514,640; as well as in published U.S. Application 2004/0086445, among others. Such materials have a very good capacity for lithium ions; and while they have reasonably good ionic conductivity, they have relatively low electron conductivities, and this factor has limited their efficiency and utility. Hence, various efforts have been undertaken to dope, modify, or otherwise supplement such materials to enhance their electrical and/or ionic conductivity.

As will be explained hereinbelow, the present invention provides a composite material based upon lithiated metal phosphates which material combines good electrical conductivity with high lithium ion capacity and conductivity. The materials of the present invention are simple and economical to synthesize, and have very good utility as cathodes for lithium batteries.

BRIEF DESCRIPTION OF THE INVENTION

Disclosed herein is a method for synthesizing a composite material by a process which begins with a starting mixture which includes at least lithium, iron, a phosphate ion, and a catalyst which promotes the formation of one or more phases which enhance electron and/or lithium ion transport in the material. The starting mixture is heated in a reducing atmosphere so as to produce a composite material which includes a first phase which comprises $Li_xM_y(PO_4)z$ wherein M is a metal, x is less than or equal to 1, and y and z are independently greater than 0; and a second phase which has an electronic and/or lithium ion conductivity greater than that of the first phase. In specific embodiments, the catalyst promotes the reduction of the phosphate ion. In other instances, the catalyst promotes the reduction of a carbon-containing species so as to generate free carbon. In yet other instances, the catalyst may direct the distribution, structure (phase) and morphology of the second phase. In some instances, the second phase includes the at least one metal M and phosphorus; and in some specific embodiments, the second phase further includes oxygen wherein the atomic ratio of oxygen to phosphorus is less than 4:1.

In particular embodiments, the at least one metal M includes iron and the second phase comprises a member selected from the group consisting of $Fe_2P_2O_7$; FeP; $Fe_2P$; $Fe_3P$; and mixtures thereof. The second phase may also include carbon, as noted hereinbelow. In particular instances, the first phase comprises 80-95 mole percent of the composite material and the second phase comprises 5-20 mole percent of the material. In particular instances, the catalyst comprises vanadium, which may be in the form of an oxide of vanadium.

The step of heating the mixture in a reducing environment may comprise heating the mixture in a gaseous environment which includes a reducing agent such as hydrogen, carbon monoxide, hydrocarbons or ammonia. In some instances, the mixture is ground, as by ball milling, before being heated in the reducing atmosphere.

Also disclosed herein are materials made by the method of the present invention as well as electrodes which incorporate that material, and batteries which incorporate those electrodes.

DETAILED DESCRIPTION OF THE INVENTION

Prior art methods for synthesizing lithiated metal phosphate materials generally relied upon a chemical reaction of precursor materials which is typically carried out at elevated temperatures. In accord with the present invention, lithiated metal phosphate compounds are prepared by reacting precursor materials under reducing conditions, typically wherein the metal component thereof is reduced from a higher to a lower oxidation state, although the invention may also be utilized in connection with processes in which the metal component is not reduced. In any instance, the inventors have found that the thus-produced material has significantly improved performance characteristics as a cathode material for lithium batteries, as compared to prior art materials.

Upon investigation, the inventors have found that the synthetic method involving a reduction step produced a two-phase material. This material was analyzed via electron microscopy and EDX, and it has been found that the thus-produced material includes a first phase which comprises a lithiated metal phosphate, and a second phase which has an electronic and, in particular instances, an ionic conductivity greater than that of the first phase. In some instances the second phase is a reduced species that includes at least the metal and phosphorus, and may also include subphosphate levels of oxygen.

In a particular material, the first phase is of the general formula $Li_xM_y(PO_4)_z$ wherein M is at least one metal such as iron, x is less than or equal to 1, and y and z are independently greater than 0; and a second phase which is the reduced form of a metal phosphate. For example, when the metal is iron, the second phase includes one or more of: $Fe_2P_2O_7$; FeP; $Fe_2P$ and $Fe_3P$. The electron conductivity of the second phase is higher than the electron conductivity of the first phase. The lithium ion transport in the second phase is also generally higher than the lithium ion transport in the first phase. The lithium ion capacity of the first phase is generally significantly higher than that of the second phase, and in some instances, the second phase does not have any lithium ion capacity. While not wishing to be bound by speculation, the inventors hereof believe that in the use of the material of the present invention as a cathode material in a lithium ion battery, the particles of the first phase provide lithium ion capacity and hence charge storage capacity, while the second phase provides for electrical and/or ionic transport between particles of the first phase and/or between various of the particles and a battery electrolyte; and in this manner, the material provides enhanced cathode performance.

At least a portion of the second phase may exist as particles separate from particles of the first phase, and in a particular instance, at least a portion of the second phase comprises filaments. In other instances, at least a portion of the second phase may exist as a coating on the particles of the first phase. Some portion of the second phase may also comprise particles dispersed within the particles of the first phase. It is also contemplated that the second phase may comprise a mixture of the foregoing morphologies.

In accord with a further aspect of the present invention, the inventors hereof have found that inclusion of relatively small amounts of a catalyst enhances the performance of the resulting cathode material, presumably by favoring formation of appropriate amounts, phase morphology or distribution of a second phase. Among the catalysts which may be so employed are vanadium, typically included in the starting mixture in the form of an oxide of vanadium. The catalyst has also been found to enhance lithium ion transport in the material as compared to comparable materials prepared in the absence of the catalyst.

The catalyst may directly reduce the phosphate component to form the second phase; or it may reduce another species such as carbon, a metal, or the like, and this species can then enhance the performance of the resultant cathode material, either directly or by promoting the formation of the second phase. For example, carbon may be generated by the reduction of organic molecules present in the reaction mixture, and this carbon can act as a direct conductivity enhancer and/or as another catalyst which promotes the formation of the second phase. Also, the catalyst may function as a nucleating agent which fosters growth of the second phase. Therefore, the role of the catalyst in promoting the formation of the second phase is to be interpreted broadly.

In accord with yet another aspect of the present invention, the methods hereof provide for the preparation of a material which includes carbon wherein the electronic state, morphology and/or disposition of the carbon in the composite material is optimized so as to provide a cathode material having enhanced electronic and ionic transport properties. Carbon may be present in the starting mixture in the form of free carbon, or as a carbon-containing species either specifically added or derived as an artifact of the process. Carbon is known to have good electrical conductivity; the presence of even relatively small amounts of carbon can enhance the electrical conductivity of materials of the type used in the practice of the present invention. It has been found that the electronic properties of $sp^2$ coordinated carbon are better with regard to the materials of the present invention than are the electronic properties of $sp^3$ coordinated carbon. While not wishing to be bound by speculation, Applicant postulates that use of the methods of the present invention provides a material having an increased concentration of $sp^2$ carbon, as compared to other processes in the prior art. For example, presence of the catalyst and/or the reduction step increases the amount of preferred $sp^2$ carbon. As a result, higher electrical conductivities are achieved.

It is also proposed that the morphology and/or distribution of the carbon is optimized through the processes of the present invention. While carbon, and in particular $sp^2$ carbon, has good electrical conductivity, it does not actively participate in lithium ion transport when the material of the present invention is utilized in a lithium ion battery. In the present invention, the high electrical conductivity of the $sp^2$ carbon enables smaller amounts of carbon to be employed thereby improving the specific capacity of the material. In addition, the methods of the present invention optimize the particle size, shape and/or distribution of the carbon so as to maximize its electronic effect while minimizing any inhibition of ionic transport. The in situo generation of carbon from an intimately mixed mixture of reactive precursors facilitates the distribution of very small particles and/or thin films of the second phase on or between particles of ionically active material. These small-dimensioned bodies of carbon establish good electrical contact between ionically active particles while minimizing any impediment to ion transport therebetween.

Therefore, in accord with this particular aspect of the present invention, it has been found that steps of the present invention including one or more of incorporation of a catalyst, milling and mixing, and reaction under reducing conditions serves to optimize the electronic and physical properties of carbon which may be included in the materials of the present invention. In this manner, both electrical conductivity and ionic storage and transport properties of the materials of the present invention are optimized with regard to their use as electrochemical materials, and in particular cathode materials for lithium batteries.

In one group of embodiments of the present invention, the first phase comprises approximately 80-95 mole percent of the composite material and the second phase comprises 5-20 mole percent of the composite material. In a particular group of materials, the first phase comprises 85-90 mole percent of the material and the second phase comprises 10-15 mole percent of the material. Typical concentrations of the catalyst material in the resultant composite material are generally fairly low, and typically fall in the range of 0.1-5 atomic percent of the total material. EDX analysis suggests that concentrations of vanadium or other residual catalysts are somewhat higher in the second phase which suggests that the catalyst material is promoting the formation of the second phase. It is possible, also, that the catalyst can act as a nucleation point for the growth of the second phase. This can be in addition to, or instead of, any action as a reducing agent.

In a typical process for the synthesis of a material of the present invention, a starting mixture which includes lithium, one or more metals such as iron, a source of phosphate ion and the catalyst is prepared. This mixture is typically blended by grinding such as in a ball mill, attritor mill, mortar or the like, and this resultant mixture is heated in a reducing environment. In some instances the milling process may introduce organic compounds into the reaction mixture, as for example from solvents or from the vessel in which milling takes place. Carbon derived from this source can have a beneficial effect on the formation of the material of the present invention. A typical reducing environment may comprise a gaseous atmosphere including one or more of hydrogen, ammonia, hydrocarbon and carbon monoxide; and in general, equal results are obtained utilizing either gas thereby suggesting that formation of any nitrogen-containing phase is not essential for the performance of the material of the present invention. In other instances, the reducing environment may be created by including solid or liquid reductants in the mixture.

In one group of syntheses, the source of lithium is a lithium salt such as lithium carbonate. The iron and phosphate ions may both be provided by utilizing a material such as ferric phosphate, which is subsequently reduced to a ferrous compound. As noted above, vanadium is one preferred catalyst material, and may be utilized in the form of $V_2O_5$. As also noted above, carbon, particularly carbon generated during the reductive synthesis, can have a beneficial effect on the formation of the materials of the present invention. Hence, small amounts of organic material may be added to the reaction mixture, either directly or as artifacts of the preparation process. This reaction mixture is heated, at atmospheric pressure, under a reducing atmosphere as noted above, to a temperature of approximately 550-600° C. for 1.5-2.0 hours. Following the reduction, the material is cooled to room temperature, typically under an inert atmosphere. Material thus produced demonstrates excellent performance characteristics when incorporated into cathodes for lithium batteries.

In one specific procedure, a first material was prepared from a starting mixture comprising: $Li_2CO_3$, 0.02 M (1.4780 g) and $FePO_4 \times H_2O$, 0.04 M (7.0031 g with Fe content of 31.9%). A second material was prepared from a mixture comprising: $Li_2CO_3$, 0.02 M (1.4780 g); $FePO_4 \times H_2O$, 0.95×0.04 M (6.6530 g with Fe content of 31.9%) and $V_2O_5$, 0.05×0.02 M (0.1819 g). The mixtures were each ball milled for 96 hours in acetone with 2 mm and 5 mm YSZ balls. The acetone slurry was discharged from the bottle and dried in air. The powders were then ground with a mortar and pestle and transferred to quartz boats for a temperature programmed reduction reaction.

In the reaction, the mixtures were heated under a hydrogen atmosphere, at a flow rate of 1.26/min., according to the following schedule: RT→350° C., 2 hrs.; 350° C.→350° C., 2 hrs.; 350° C.→600° C., 3 hrs.; 600° C.→600° C., 1.5 hrs. Thereafter, the samples were cooled to 100° C. and passivated in an $O_2$/He atmosphere.

In the vanadium-free sample, particles ranged in size from 50 nm to several microns, and the micron sized particles had nanometer sized features. EDX analysis of two 200 nm sized particles showed an atomic percent ratio of Fe:P:O of 29.4:28:42.6 and 25.8:28.5:45.7, indicating the presence of phosphate and partially reduced phosphate. EDX analysis of a micron sized whisker structure showed an atomic percent ratio for Fe:P:O of 49.1:48.9:2.0 indicating the presence of FeP. EDX of one spot on a micron sized whisker showed Na peaks with an atomic percent of 11.6. All other EDX on different spots showed an Fe:P ratio of around 1 with an atomic percent of O of 1.6 to 49.5 indicating the presence of phosphate, partially reduced phosphate and FeP, but there was no indication of $Fe_2P$ or $Fe_3P$.

Similar analyses of the V containing material showed particle sizes ranging from 50 nm to several microns with nanometer sized features on the micron sized particles. EDX of one 150 nm particle showed Fe:P:O:V atomic percent ratios of 2.68:25.1:47.2:1.0 indicating the presence of phosphate and partially reduced phosphate. EDX of a 30 nm particle showed a Fe:P:O:V atomic percent ratio of 59.4:33.9:3.9:2.9 indicating the formation of $Fe_2P$ with the presence of V. EDX of a 150 nm long whisker showed a Fe:P:O:V atomic percent ratio of 68.8:30.5:0.6:0.1 indicating the formation of $Fe_2P$ and $Fe_3P$ without the presence of V. EDX of three different sized whiskers showed the presence of $Fe_2P$. EDX of round particles showed no difference in phosphate formation in the bulk and at edges. The deflection pattern of $LiFePO_4$ indicates the olivine crystal structure.

The foregoing description has primarily been directed to iron containing materials; however, it is to be understood that composite materials based upon other metals may likewise be fabricated in accord with the principles of the present invention. Also, the material of the present invention has been described with primary reference to its use as a cathode material for lithium batteries. It is to be understood that this material, owing to its good electronic and ionic properties, will also have utility in other electrochemical applications, such as chemical reactors, other battery systems, electronic devices and the like. Also, the material of the present invention will have utility in various catalytic applications both as an electrocatalyst and a non-electrocatalyst. Accordingly, it is to be understood that the foregoing description and discussion is illustrative of specific embodiments of the invention, but is not meant to be a limitation upon the practice thereof. It is the following claims, including all equivalents, which define the scope of the invention.

The invention claimed is:

1. A method for synthesizing a composite material, said method comprising the steps of:
    providing a starting mixture which includes lithium, at least one metal M, a phosphate ion, and a catalyst comprising vanadium, which promotes the formation of a phase which enhances electron and/or lithium ion transport;
    heating said mixture in a reducing environment so as to produce a composite material which includes a first phase which comprises $Li_xM_y(PO_4)_z$ wherein M is said at least one metal, y and z are independently greater than 0, and x is less than or equal to 1; and a second phase which has an electronic and/or lithium ion transport greater than that of the first phase.

2. The method of claim 1, wherein x is greater than 0.

3. The method of claim 1, wherein said catalyst promotes the reduction of the phosphate ion.

4. The method of claim 1, wherein said second phase includes M and phosphorus.

5. The method of claim 4, wherein said second phase further includes oxygen, and the atomic ratio of oxygen to phosphorus is less than 4:1.

6. The method of claim 1, wherein said at least one metal M includes iron.

7. The method of claim 6, wherein said second phase comprises a member selected from the group consisting of: $Fe_2P_2O_7$; FeP; $Fe_2P$; $Fe_3P$ and combinations thereof.

8. The method of claim 1, wherein said first phase comprises 80-95 mole percent of said composite material and said second phase comprises 5-20 mole percent of said composite material.

9. The method of claim 1, wherein said vanadium is introduced in the starting mixture in the form of $V_2O_5$.

10. The method of claim 1, wherein said catalyst promotes the reduction of a carbon-containing species, so as to generate free carbon.

11. The method of claim 10, wherein said carbon is at least partially $sp^2$ bonded, and the ratio of $sp^2$ to $sp^3$ bonded carbon generated in the presence of said catalyst is greater than it would be in the absence of said catalyst.

12. The method of claim 1, wherein said reducing environment comprises a gaseous environment which includes one or more of hydrogen, carbon monoxide and ammonia.

13. The method of claim 6, wherein the iron in said starting mixture is in the form of an $Fe^{+3}$ ion.

14. The method of claim 1, including the further step of grinding said mixture prior to heating said mixture in the reducing environment.

15. The method of claim 14, wherein the step of grinding said mixture comprises grinding said mixture in a ball mill.

16. The method of claim 1, wherein the step of heating said mixture comprises heating said mixture to a temperature in the range of 300-600° C.

17. The method of claim 1, wherein the catalyst is a nucleating agent which promotes the growth of the second phase.

18. The method of claim 1, wherein said starting mixture includes a source of carbon.

19. The method of claim 18, wherein said source of carbon is an organic compound.

* * * * *